April 26, 1927.

F. C. CRAWFORD 1,625,795

METHOD OF MAKING A DRAG LINK ELEMENT

Original Filed Jan. 11, 1923    2 Sheets-Sheet 1

INVENTOR
FREDERICK C. CRAWFORD
BY
ATTORNEY.

April 26, 1927.  F. C. CRAWFORD  1,625,795
METHOD OF MAKING A DRAG LINK ELEMENT
Original Filed Jan. 11, 1923   2 Sheets-Sheet 2

INVENTOR
FREDERICK C. CRAWFORD
BY
ATTORNEY.

Patented Apr. 26, 1927.

1,625,795

UNITED STATES PATENT OFFICE.

FREDERICK C. CRAWFORD, OF DETROIT, MICHIGAN, ASSIGNOR TO THE STEEL PRODUCTS COMPANY, OF CLEVELAND, OHIO, A CORPORATION OF OHIO.

METHOD OF MAKING A DRAG-LINK ELEMENT.

Original application filed January 11, 1923, Serial No. 612,143. Divided and this application filed March 15, 1924. Serial No. 699,422.

My invention relates to methods of manufacturing elements for use in drag-links, tie-rods, or the like, forming part of the steering mechanism of automotive vehicles, such as automobiles and trucks.

The object of the invention is to produce a device of the above described character in an economical and efficient manner.

Said invention consists of a method of producing a socket, hereinafter fully described and particularly set forth in the claims, said method being also disclosed in my pending application Serial No. 612,143, filed January 11, 1923, in which said socket is specifically claimed. This invention furthermore constitutes a specific application of the method disclosed in Patent No. 1,610,769, issued to Matthew P. Graham December 14, 1926, on an application of even date herewith.

The annexed drawings and the following description set forth in detail a certain method embodying my invention, together with a drag-link element produced thereby, the disclosure, however, constituting but one of the various ways in which the principle of my invention may be applied.

Figure 1:
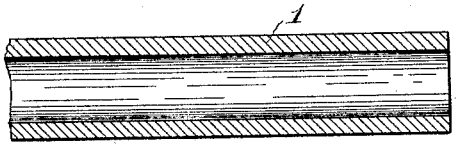
Figure 1 represents an axial section of the end portion of a tubular member from which the body member of my invention is constructed.
Figure 2:
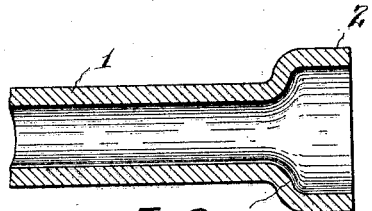
Fig. 2 represents an axial section of said end portion after the first step in the operation has been completed.
Figures 3, 4:
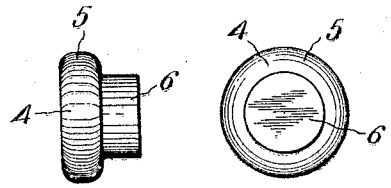
Fig. 3 represents a side elevation and Fig. 4 an end view of the abutment member forming part of the device.
Figure 5:
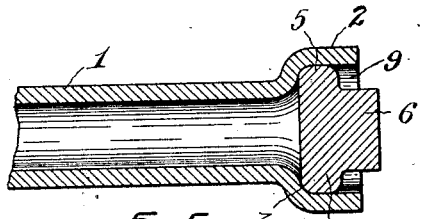
Fig. 5 represents an axial section showing the end of the body member and the abutment member assembled.
Figure 6:
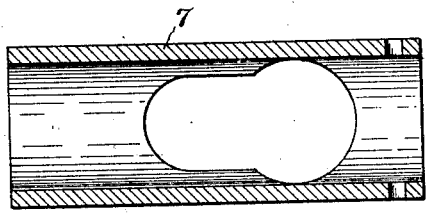
Fig. 6 represents an axial section of the socket member which is to be welded to the flange on the body member.
Figure 7:
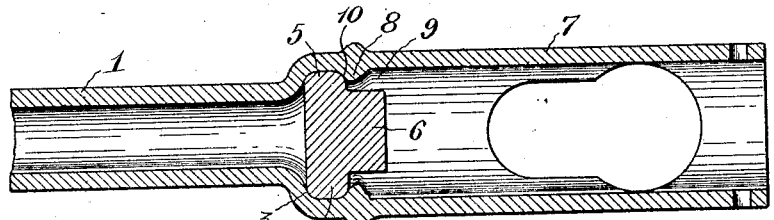
Fig. 7 represents an axial section of the end of the body member, the abutment member in place and the socket member welded thereto.

Referring first to the construction shown in Figs. 1 to 8 inclusive, in carrying out my invention I first take a tubular member 1 and upset same to form an end flange 2 of larger diameter than that of said tube 1. I then place in the flange cavity and against the shoulder 3 formed thereon, an abutment member 4. This member consists of a cylindrical portion 5 of a diameter substantially equal to the interior diameter of the flange 2, and a cylindrical portion 6 of reduced diameter, the inner peripheral portion of the part 5 being preferably made to conform in contour with the said shoulder, as shown in Fig. 5. A tubular socket member 7 is then butt-welded to the end of the flange 2, the dimensions of the parts being such that the intruded metal 8 formed during the welding operation will flow into the annular space 9 formed between the part 6 of the abutment member and the socket, and engage the outer surface 10 of the part 5 of said abutment member. The latter is thereby secured in place in the socket and the part 6 thereof projects into the socket cavity, as shown in Fig. 7. The outer extruded metal or burr 11 is then ground off or otherwise removed.

Figure 8:
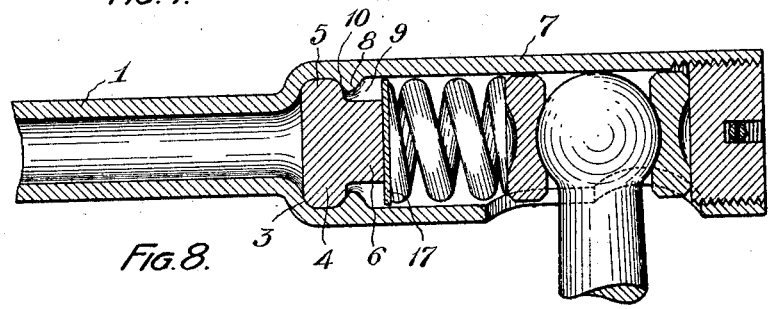
Fig. 8 represents an axial section of a completed drag-link and associated parts of which the element included in my invention forms a part.

The outer end of the abutment member extends beyond the welded joint and forms a stop for the associated parts of the drag-link as shown in Fig. 8. The extruded metal 8 being located in the annular space forms no impediment or obstruction to the placing of these parts within the socket, as will be readily seen, and as in the case of the Graham invention above referred to.

Figure 9:
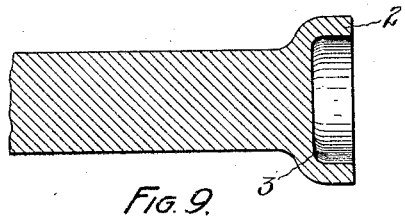
Fig. 9 represents an axial section of the end of a modified form of the main body member which may be substituted for the tubular member shown in Fig. 2.

The above process of construction may be applied to a body member formed out of solid stock such as is shown in Fig. 9 as will be readily understood by those skilled in the art.

Figure 11:
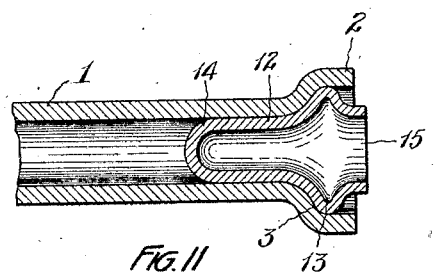
Fig. 11 represents an axial section of the end portion of a tubular body member showing the modified form of abutment member associated therewith.
Figure 10:
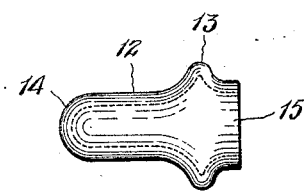
Fig. 10 represents a side elevation of a modified form of abutment member.
Figure 12:
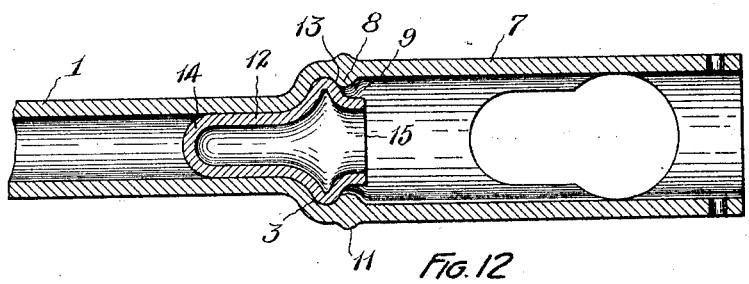
Fig. 12 represents an axial section of the end of a drag-link element in which the modified form of abutment member is used and prior to its completion.

In Figs. 10 to 13 inclusive, is illustrated a structure practically identical with the previously described device, but in which the abutment member 12 is pressed or otherwise formed into a cup-shape having an intermediate diametrically enlarged portion 13 which seats against the shoulder 3 as shown in Fig. 11. The closed end portion 14 of this member 12 is of an exterior diameter substantially equal to the interior diameter of the body member 1 and extends into the latter. As before, the tubular socket member 7 is welded to the flange 2 and the intruded metal 8 engages the portion 13 and secures the abutment member in place. The open end portion 15 projects into the socket cavity and beyond the weld.

The extruded metal or burr 11 is then removed and the element is then ready for the reception of the associated drag-link parts.

Figure 13:
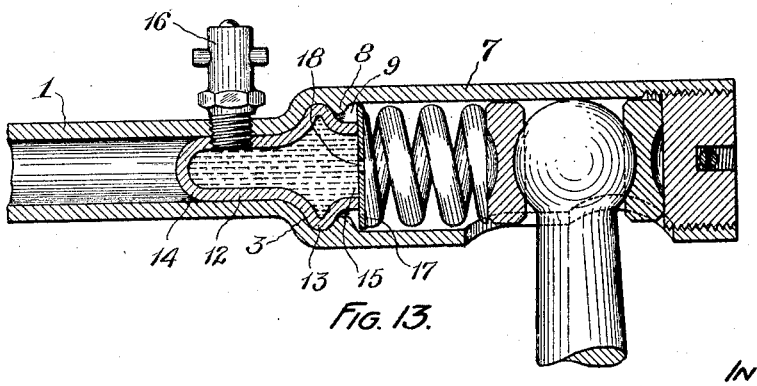
Fig. 13 represents an axial section of a complete drag-link element and associated parts, in which the said modified form of abutment member is used.

This last described structure may be further amplified by providing a lubricating connection 16 passing through the member 1 and the abutment member 12, as shown in Fig. 13, whereby the interior of said abutment member may be supplied with a suitable lubricant. In this case the end plate 17 which forms one of the associated parts of the drag-link is provided with a central aperture 18 through which such lubricant may reach the interior of the socket, all as will be readily understood by those skilled in the art.

What I claim is:

1. The method of making an element for drag-links or the like, which consists in forming an end-flange upon a body portion of said element; placing in the flange recess an abutment member which is adapted to form an annular space between it and said flange; butt-welding a tubular socket-member to said flange and permitting the intruded metal to engage said abutment-member whereby such metal when cool will secure said abutment member in place.

2. The method of making an element for drag-links or the like, which consists in forming an end-flange upon a body-portion of said element; placing in the flange recess an abutment member which is formed with an end portion of smaller diameter than the interior diameter of said recess and a diametrically enlarged portion of substantially the same diameter as said interior; said enlarged portion engaging the interior flange shoulder; welding a socket member to said flange, and permitting the intruded metal to engage said enlarged portion, whereby such metal when cool will secure said abutment member in place.

Signed by me this 11th day of February, 1924.

FREDERICK C. CRAWFORD.